United States Patent
Braitberg et al.

(10) Patent No.: US 6,980,652 B1
(45) Date of Patent: *Dec. 27, 2005

(54) COMBINATION MASTERED AND WRITEABLE MEDIUM AND USE IN ELECTRONIC INTERNET APPLIANCE

(75) Inventors: Michael F. Braitberg, Boulder, CO (US); Steven B. Volk, Boulder, CO (US); Daniel R. Zaharris, Longmont, CO (US); David H. Davies, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 715 days.

This patent is subject to a terminal disclaimer.

(21) Appl. No.: 09/721,587

(22) Filed: Nov. 21, 2000

Related U.S. Application Data

(62) Division of application No. 09/527,982, filed on Mar. 17, 2000, now Pat. No. 6,580,683.

(60) Provisional application No. 60/140,633, filed on Jun. 23, 1999.

(51) Int. Cl.$^7$ ............................................. H04N 7/167
(52) U.S. Cl. .................. 380/201; 380/205; 380/231; 380/232; 282/100; 282/232; 705/50; 705/51; 705/52; 705/59
(58) Field of Search .......... 713/193; 369/275.2–275.5, 369/112, 275, 109, 44; 380/4, 201–205, 231–232; 382/100, 232; 705/50–52, 59

(56) References Cited

U.S. PATENT DOCUMENTS

| | | |
|---|---|---|
| 3,530,441 A | 9/1970 | Ovshinsky .................. 340/173 |
| 3,868,651 A | 2/1975 | Ovshinsky .................. 340/173 |
| 3,983,542 A | 9/1976 | Ovshinsky .................. 340/173 |
| 4,205,387 A | 5/1980 | Ovshinsky et al. ......... 364/900 |
| 4,542,495 A | 9/1985 | Ziegler et al. .............. 369/273 |
| 4,571,718 A | 2/1986 | Cahill et al. ................ 369/291 |
| 4,577,289 A | 3/1986 | Comerford et al. ......... 364/900 |
| 4,647,944 A | 3/1987 | Gravesteijn et al. ......... 346/1.1 |
| 4,710,899 A | 12/1987 | Young et al. ............... 365/113 |
| 4,872,156 A | 10/1989 | Steenbergen et al. ....... 369/275 |
| 4,945,530 A | 7/1990 | Sandell et al. .............. 369/291 |
| 4,953,209 A | 8/1990 | Ryder, Sr. et al. ........... 380/23 |
| 4,960,680 A | 10/1990 | Pan et al. ................... 430/346 |
| 5,060,106 A | 10/1991 | Davis et al. ................ 360/133 |
| 5,063,558 A | 11/1991 | Takahashi ................... 369/291 |
| 5,073,889 A | 12/1991 | Rayner ....................... 369/291 |
| 5,077,726 A | 12/1991 | Dodds et al. ............... 369/291 |
| 5,103,476 A | 4/1992 | Waite et al. ................... 380/4 |
| 5,128,099 A | 7/1992 | Strand et al. ............... 420/579 |
| 5,146,552 A | 9/1992 | Cassorla et al. ............ 395/145 |
| 5,150,339 A | 9/1992 | Ueda et al. ................... 369/32 |

(Continued)

*Primary Examiner*—Ayaz Sheikh
*Assistant Examiner*—Longbit Chai
(74) *Attorney, Agent, or Firm*—Jonathan W. Hallman; MacPherson Kwok Chen & Heid LLP

(57) ABSTRACT

An optical medium uses a single structure or format (such as identical materials, layers and the like) for both a region for holding mastered data and a writeable area. In one aspect, a writeable region of a medium with mastered content is used in connection with paying, collecting or accounting for usage or royalties for proprietary intellectual property embodied in or associated with the content. In one embodiment, the (preferably write-once) writeable area can be used for storing later-written information such as annotations, highlighting, reordering, remixing, modifications, supplements, collections, additions, bookmarks, cross references, hypertext or hyperlinks and the like. Preferably, annotations and similar materials can be associated, by the user, with particular portions or content of the mastered data.

3 Claims, 2 Drawing Sheets

U.S. PATENT DOCUMENTS

| | | | |
|---|---|---|---|
| 5,241,531 A | 8/1993 | Ohno et al. | 369/275.2 |
| 5,247,575 A | 9/1993 | Sprague et al. | 380/9 |
| 5,271,978 A | 12/1993 | Vazan et al. | 428/64 |
| 5,272,693 A | 12/1993 | Fujisawa | 369/291 |
| 5,280,467 A | 1/1994 | Wanger et al. | 369/275.5 |
| 5,323,380 A | 6/1994 | Oda et al. | 369/275.1 |
| 5,331,627 A | 7/1994 | Childers et al. | 369/291 |
| 5,339,091 A | 8/1994 | Yamazaki et al. | 345/104 |
| 5,379,266 A | 1/1995 | Russell | 365/234 |
| 5,436,871 A | 7/1995 | Russell | 365/234 |
| 5,447,768 A | 9/1995 | Takahashi | 428/66.6 |
| 5,465,238 A | 11/1995 | Russell | 365/234 |
| 5,475,399 A | 12/1995 | Borsuk | 345/130 |
| 5,511,035 A | 4/1996 | Russell | 365/234 |
| 5,511,058 A | 4/1996 | Visel et al. | 369/103 |
| 5,530,235 A | 6/1996 | Stefik et al. | 235/492 |
| 5,532,920 A | 7/1996 | Hartrick et al. | 364/419.1 |
| 5,534,385 A | 7/1996 | Spahn | 430/270.13 |
| 5,541,888 A | 7/1996 | Russell | 365/234 |
| 5,555,304 A | 9/1996 | Hasebe et al. | 380/4 |
| 5,563,947 A | 10/1996 | Kikinis | 380/4 |
| 5,581,540 A | 12/1996 | Dang | 369/291 |
| 5,587,994 A | 12/1996 | Nagaura et al. | 369/291 |
| 5,591,501 A | 1/1997 | Ovshinsky et al. | 428/64.1 |
| 5,610,902 A | 3/1997 | Childers et al. | 369/289 |
| 5,619,488 A | 4/1997 | Ota et al. | 369/112 |
| 5,629,980 A | 5/1997 | Stefik et al. | 380/4 |
| 5,638,241 A | 6/1997 | Sonderegger | 360/133 |
| 5,650,991 A | 7/1997 | Fujiie | 369/275.4 |
| 5,654,856 A | 8/1997 | Akiyama et al. | 360/133 |
| 5,684,785 A * | 11/1997 | Itami et al. | 369/275.2 |
| 5,696,714 A | 12/1997 | Russell | 365/106 |
| 5,703,951 A | 12/1997 | Dolphin | 380/25 |
| 5,719,850 A | 2/1998 | Yoshioka et al. | 369/283 |
| 5,719,972 A | 2/1998 | Caron et al. | 385/18 |
| 5,726,971 A | 3/1998 | Wanger et al. | 369/291 |
| 5,732,058 A | 3/1998 | Iwamura et al. | 369/75.2 |
| 5,737,300 A | 4/1998 | Ota et al. | 369/112 |
| 5,748,609 A | 5/1998 | Tanaka | 369/291 |
| 5,757,584 A | 5/1998 | Schick | 360/99.08 |
| 5,757,908 A | 5/1998 | Cooper et al. | 380/4 |
| 5,764,603 A | 6/1998 | Glaser-Inbari | 369/44.23 |
| 5,765,152 A | 6/1998 | Erickson | 707/9 |
| 5,768,241 A | 6/1998 | Kanazawa et al. | 369/77.2 |
| 5,793,584 A | 8/1998 | Knight et al. | 360/133 |
| 5,793,742 A | 8/1998 | Sandell et al. | 369/291 |
| 5,796,697 A | 8/1998 | Masaki et al. | 369/75.2 |
| 5,799,157 A | 8/1998 | Escallon | 395/227 |
| 5,808,986 A | 9/1998 | Jewell et al. | 369/44.37 |
| 5,812,519 A | 9/1998 | Kawamura et al. | 369/275.1 |
| 5,812,661 A | 9/1998 | Akiyama et al. | 380/4 |
| 5,828,482 A | 10/1998 | Jain | 359/211 |
| 5,831,967 A | 11/1998 | Otsuka et al. | 369/291 |
| 5,831,968 A | 11/1998 | Tanaka | 369/275.1 |
| 5,835,589 A | 11/1998 | Nakashima | 380/4 |
| 5,838,653 A | 11/1998 | Fan et al. | 369/275.1 |
| 5,850,384 A | 12/1998 | Ohmori et al. | 369/291 |
| 5,857,021 A | 1/1999 | Kataoka et al. | 380/4 |
| 5,859,829 A | 1/1999 | Otsuka et al. | 369/77.2 |
| 5,859,831 A | 1/1999 | Naito et al. | 369/291 |
| 5,870,364 A | 2/1999 | Raczynski | 369/47 |
| 5,876,823 A | 3/1999 | Nagashima | 428/64.1 |
| 5,881,038 A | 3/1999 | Oshima et al. | 369/59 |
| 5,886,979 A | 3/1999 | Moribe et al. | 369/275.3 |
| 5,892,825 A | 4/1999 | Mages et al. | 380/3 |
| 5,897,324 A | 4/1999 | Tan | 434/317 |
| 5,912,786 A | 6/1999 | Nicklos et al. | 360/99.09 |
| 5,930,074 A | 7/1999 | Nicklos | 360/99.06 |
| 5,930,215 A | 7/1999 | Fite et al. | 369/58 |
| 5,946,282 A | 8/1999 | Hirono et al. | 369/112 |
| 5,949,601 A | 9/1999 | Braithwaite et al. | 360/60 |
| 5,963,532 A | 10/1999 | Hajjar | 369/112 |
| 5,995,474 A * | 11/1999 | Shimano et al. | 369/13.32 |
| 6,031,808 A | 2/2000 | Ueno | 369/111 |
| 6,052,465 A * | 4/2000 | Gotoh et al. | 369/53.21 |
| 6,314,409 B2 * | 11/2001 | Schneck et al. | 705/54 |
| 6,580,683 B1 * | 6/2003 | Braitberg et al. | 369/275.3 |
| 6,631,359 B1 * | 10/2003 | Braitberg et al. | 705/50 |

* cited by examiner

COMBINATION MASTERED AND WRITEABLE MEDIUM AND USE IN ELECTRONIC INTERNET APPLIANCE

This is a division of application Ser. No. 09/527,982, filed Mar. 17, 2000, now U.S. Pat. No. 6,580,683, which claims the benefit of provisional application No. 60/140,633 filed Jun. 23, 1999.

Cross reference is made to U.S. patent application Ser. No. 09/315,398 of Braitberg, et al., filed May 20, 1996 incorporated herein by reference.

The present invention is directed to an apparatus and process providing distribution of text audio, video or other content on a medium such as an optical disk storage medium which includes both mastered regions and recordable regions (writeable regions) and in particular to a small-format, lightweight apparatus and method of use, for distributing content on disks to facilitate either or both of buying and selling (with appropriate royalty payments for proprietary intellectual property) and/or annotation correction or revision of the content, e.g., using the writeable area.

BACKGROUND INFORMATION

A number of benefits can be achieved using a medium which can readily and economically provide both mastered content and the ability to write or record information. As used herein, "mastered" content means content provided on the medium before it reaches the user. A common example is music CD's in which the music is mastered prior to distribution to users. Information written onto the same medium containing mastered content can be useful, e.g., in any of a number of systems for accounting for or collecting usage fees, royalties or similar charges for use of proprietary intellectual property in such content, including systems involving use of the Internet (or other communications systems), thus effectively providing a device which is not only an electronic book, music or multimedia player or similar content-output device, but also effectively an Internet appliance (i.e., an apparatus which can operate, at least partially, in connection with information obtained using the Internet or similar communication system).

Other potential benefits from a practical and economic mastered/writeable medium or media player includes the ability to annotate, supplement, update, correct or otherwise supplement or modify the mastered data with new or additional data. Accordingly, it would be useful to provide a system apparatus and/or process which is practical and economical for both mastering of content and writing of content or other data on the same medium.

Many previous attempts to provide mastered and writeable portions on the same medium have encountered or resulted in various problems. Some data storage media are pre-recorded only in a serial fashion, such that it is not possible or feasible to produce the entire content at one time. A typical example is the pre-recording of audio tapes which, even if recorded at high speed and/or simultaneously recording multiple tracks, were generally recorded serially, i.e., beginning at one physical end of the tape and recorded along the length of the tape to the other end. In general, the amount of time required for such serial pre-recording can render the process substantially economically unattractive. Accordingly, it would be useful to provide a system, apparatus and method involving both mastered and writeable portions wherein the mastered content is provided in the medium substantially all at once.

Many systems that involve writeable media are unsuitable for long-term or secure storage, either because the written information is re-writeable (e.g., typical CD-RW media) or because the information tends to degrade in a relatively short time period (or both). Accordingly it would be useful to provide a system, apparatus and method involving both mastered and writeable portions in which, if desired, the writeable portions can be provided in a form which is not re-writeable or erasable, and/or which is relatively long-lived, so as to provide archival information storage, e.g., storage for about ten years or more substantially without information loss.

Although there are techniques for mastering content all at once (such as stamping or pressing of vinyl audio recordings or injection molding of compact disks (CDs) and the like), the techniques and materials used in these processes are generally different from those used for providing writeable areas. Although it is possible to provide, e.g., a dye-based or other writeable optical disk with some data thereon pre-recorded, typically the pre-recorded data on a dye-based CD must be serially recorded. Accordingly, previous approaches, in order to provide both parallel-written, mastered content and writeable areas were required to have different regions for these two different types of areas and different materials and techniques, such as an optical disk having an inner radial area with molded mastered content and an outer radial area with writeable dye media. Media with two different regions of material have proved to be expensive and unreliable to produce. Moreover, the techniques, machinery and materials for producing such a two-medium storage device would typically predetermine the relative amount of mastered, versus writeable, area and thus was relatively inflexible such that changing the relative proportion of mastered and writeable area would require substantial retooling or redesign of fabrication processes. Accordingly it would be useful to provide a system, apparatus and method achieving parallel-written mastered material and writeable regions on a single-medium substrate, preferably such that the materials and techniques for the two areas used for forming the two areas are substantially the same, with the areas differing substantially only as to whether the region has content molded (or otherwise mastered) therein.

Furthermore, many systems require different sets or ranges of optical parameters for reading mastered data versus reading later-written data and/or for reading mastered data versus writing data. In some cases this means that two or more sets of optical apparatus (such as two different wavelengths of laser, powers of laser, optical trains or optical arms or the like) must be provided in a single playback and/or read/write drive. Accordingly, it would be advantageous to provide an apparatus system and method using a medium which has both parallel-written mastered data and writeable areas, but which can be used (for reproduction and/or writing) using a single optical train or optical arm, a single and/or a single wavelength of light.

In many situations, a person who annotates text (or other content) cannot effectively position or store the annotations so that they appear adjacent to, or otherwise related to, the text to which they refer. In some situations, annotations are not readily found or accessible. Accordingly, it would be useful to provide a system, apparatus and method which provides for annotations of mastered content in such a fashion that the user can control the positioning, association and/or relationship to mastered content, and/or can readily and conveniently index, search, link, modify or otherwise use and manipulate annotations or other later-written content.

In general, it would be useful to provide an apparatus, system and method which can readily provide for accounting or payment of royalties for proprietary intellectual property and/or provide annotations, updates, supplements, corrections or other later-written, i.e., (not mastered) content in a fashion which is practical and economical. It would be advantageous to provide apparatus, systems and methods for playing or reproducing both prerecorded and later-written content or data, on such medium in a manner which is economical, lightweight, small and otherwise convenient. It would be particularly advantageous to provide an apparatus for use in connection with such medium which was sufficiently small and lightweight as to be practical for use in or with a personal electronic device (PED).

SUMMARY OF THE INVENTION

The present invention includes a recognition of the existence and nature of certain problems in previous approaches, including as described herein.

In one embodiment, an optical medium uses a single structure or format (such as identical materials, layers and the like) for both a region for holding mastered data, e.g., data which is written substantially all at once or in parallel, and for defining a writeable area, such as a user-writeable area. In one embodiment the mastered data or content is provided by an injection molding process. In one embodiment the data layer is a phase change layer including a phase change film. One suitable medium is described in application Ser. No. 09/315,398, supra, incorporated herein by reference. In one embodiment the medium has a high data density of about 2.6 Gigabit per square inch of data surface. By providing a high data density of this type, the present invention can provide for both a relatively large amount of mastered content and a relatively large amount of writeable area, e.g., totaling about 0.25 Gigabytes or more on one side of an optical disk, while providing a small form factor, such as a disk with a diameter less than about 35 millimeters. In this way, it is possible, for example, to provide a disk which can include uncompressed text data equivalent to about 45 or more 1000-page books, plus a writeable area sufficient to accommodate about 5000 or more pages of annotations, comments, revisions, etc., on a disk having a diameter of about 35 millimeters. Preferably the writeable area, if desired, can be formed in a fashion such that information written therein is not normally re-writeable or erasable. Preferably the data, including later-written material is archival in nature such as having a expected data integrity life time of at least about 10 years or more.

In one embodiment a writeable region of a medium with mastered content is used in connection with paying, collecting or accounting for usage or royalties for proprietary intellectual property embodied in or associated with the content. According to one aspect, at least some of the mastered content is unavailable for display, playback or other reproduction or use until a user has entered a key or code (e.g. a code with which the user receives an exchange for a payment). For example, some or all of the mastered content may be encrypted and the key or code may form some or all of the information needed for decrypting the mastered content. Such code-enabled accessed to mastered content can be provided in conjunction with the writeable area of the medium in a number of fashions. In one embodiment, it is desired to provide for access to the mastered content which is limited or restricted in one or more of a variety of fashions, such as being limited to use on a particular playback device, limited to use by a particular user or person, limited to a certain number of playbacks, limited to a predetermined time period of playback, limited to using a particular geographic location or site, or combinations thereof and the like. For example, the system can be configured such that, in response to a user's entry of an access code, the system will record, into the writeable area, information pertinent to the license (or other use rights) for the mastered data. For example, when use is to be limited to a particular playback device, the system can be configured such that a processor serial number, playback device serial number or other identifier of the playback device is recorded into the writeable area. Thereafter, before reproducing the mastered content, the system will verify that the identifier for the playback device matches and identifier recorded on the writeable area. In some embodiments, information providing playback rights for a second playback device may be recorded into the writeable area, usually in addition to or in place of the original playback device identifier, e.g. in response to entry of a second access code (such as provided in exchange for a second royalty or other payment).

In one embodiment, the (preferably write-once) writeable area can be used for storing later-written information such as annotations, highlighting, reordering, remixing, modifications, supplements, collections, additions, bookmarks, cross references, hypertext or hyperlinks and the like. Preferably, annotations and similar materials can be associated, by the user, with particular portions or content of the mastered data. For example, when the mastered data includes some or all portions of a text book or similar academic or teaching content, a student or other user may preferably insert notes or annotations e.g. taken during lectures, for later review which will preferably be displayed (or available) adjacent the content to which such notes or annotations refer or relate. In one embodiment, some or all of the annotations may be effectively blocked from viewing by a second user (such as another student who licenses the mastered content at a later time). Preferably the annotations or similar material can be indexed, searched, modified, linked, and the like. In one embodiment the medium, as distributed to users, includes executable programs, such as search engine programs (e.g. for use in searching mastered content or other items), database programs (e.g. for use in organizing or accessing mastered content or other items) and/or programs related to decryption (or other copy protection functions) or annotations (or similar later-written information). In this way, the media can be self-executing, and/or platform independent, in the sense that users can perform desired functions or operations without having to separately acquire and load software for performing such functions. Preferably, techniques are included in the disk data format to prevent binary copies.

DETAILED DESCRIPTION OF THE PREFERRED EMBODIMENT

Figure 1A:
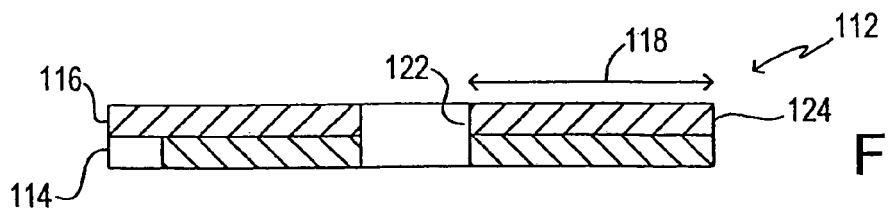
FIG. 1A is a cross sectional view of an optical disk without molded content, according to one embodiment of the present invention.

According to one embodiment of the invention, a data recording medium such as an optical disk is provided which can be configured to have both mastered content and one or more writeable areas. In one embodiment, the disk is a first surface, writeable medium generally as described in application Ser. No. 09/315,398, supra, incorporated herein by reference. As depicted in FIG. 1A, in the absence of mastered content, the disk 112 has a substrate 114 and a recording layer 116. The recording layer 116 may be vertically monolithic or may be made up of a plurality of films. Preferably, the recording layer 116 includes materials and structure of such a nature that mastered material may be formed in a substantially parallel fashion, i.e. such that substantially all of the mastered material is provided at one time. In one embodiment, an injection molding process is used for providing mastered material. Preferably, the recording layer 116 is also of such a nature that some or all of at least those areas which are not mastered, are writeable. Examples of recording layers having these characteristics are described in Ser. No. 09/315,398 supra. As depicted in FIG. 1A, in one embodiment a first radial extent 118 of the disk 112 has such a recording layer thereon. Although, in the depiction of FIG. 1a, the radial extent 118 is depicted as extending through the entirety of the region from the central opening 122 to the outer edge 124, the particular read and/or write formats or procedures used in connection with the disk 112 may and/or fabrication procedures may result in certain areas e.g. radially adjacent the central opening 112 or edge 124, be provided without recording layer materials 116 and/or with recording layer material 116 which is not used and/or not usable for mastered content or writeable areas. In one embodiment, the disk 112 is of such a nature that, if no portion of the radial extent 118 is mastered, then the entire radial extent 118 would, at least theoretically, be writeable (although a particular read/write technology used in connection with the disk may mean that certain areas or portions of the radial extent 118 are reserved for formatting, tracks, grooves, servo or similar items and thus normally unavailable for user writing.) Preferably, the recording layer 116 of FIG. 1a is of such a nature that substantially any portion thereof may be parallel-written with mastered data or content.

Figure 1B:
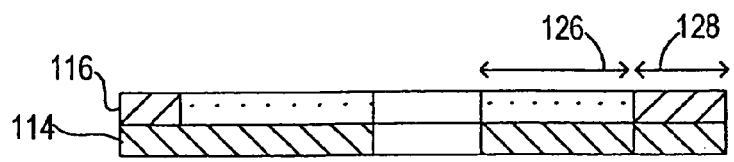
FIG. 1B is a cross sectional view of an optical disk with molded content, according to one embodiment of the present invention.

In one embodiment, mastered content is provided in a radial extent 126 (FIG. 1B) by a molding process. Preferably the mastered content is digital content and the molding provides optically-readable bits (using any of a plurality in coding techniques, including, error correction or error correctable coding, run link limited coding, and similar techniques as will be understood by those of skill in the art after understanding the present invention). Although FIG. 1B depicts a single radial extent 126 being used for the mastered contents, it is possible to distribute mastered content on the disk 112 in a number of fashions including a plurality of spaced-apart radial extents or "tracks" one or more continuous spiral regions, circumferential regions or sectors, multiple layers, regions on both disk surfaces and the like. Preferably, substantially all portions of the recording layer radial extent 118 which are not mastered (such as by molding and the like) are regions that are available for writing (such as radial region 128 in the example depicted in FIG. 1B). In one embodiment, the same molding procedure which provides the mastered content in area 126 is also used to provide formatting, sector, focus, tracking and/or test areas in the (otherwise) writeable region of the disk 112. In one embodiment, the disk 112 is available for use following the molding procedure. In another embodiment, additional steps are provided following the molding procedure such as coating with a preferably thin (e.g. less than about 100 nm) protective material, hardening, curing, or other coating steps and the like. In some embodiments, information (such as information which will not be the same on all the media) is written in the writeable areas before distribution to the user, e.g. by the manufacturer and/or distributor. Information can include some or all of a serial number (or other identifier), date and/or time of manufacture, encryption/decryption information and the like. For certain types of written information, it is preferred that the information should be write-once (such as serial number or encryption/decryption information).

The relative portion of the initial radial extent 118 which is devoted to mastered, versus writeable, regions can be distributed in any a number of fashions, depending on, e.g., the anticipated use for the writeable region 128. For example, if it is anticipated that the writeable region 128 is to be used only for security, licensing, decryption and similar purposes (e.g. as described below) a relatively small portion, such as less than 5%, preferably less than about 1%, can be devoted to writeable area. If, however, it is anticipated that extensive updates, corrections, annotations (possibly from two or more different users) and the like will be written, then a relatively larger portion 128 for the writeable area may be desired, such as about 5 to 10% or more.

Figure 4:
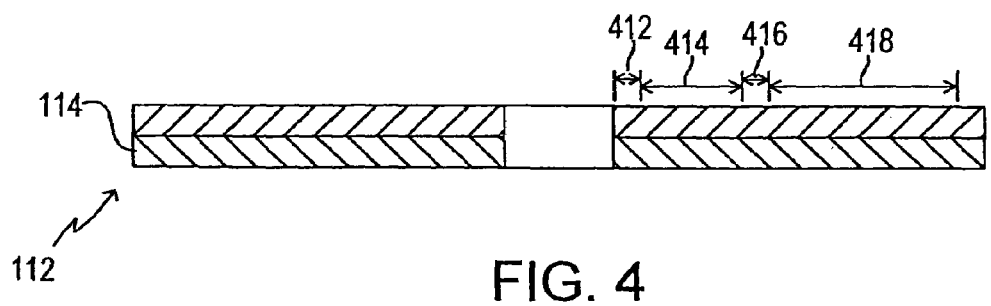
FIG. 4 is a cross-sectional view illustrating one example of storage of data on a disk according to an embodiment of the present invention.

A number of systems can be used for storing data on a disk in accordance with the present invention. FIG. 4 shows one possibility for data storage, for purposes of illustrating one example, and those of skill in the art will understand how to provide other data storage systems, after understanding the present invention. It is common (although not necessary), in optical disk systems, for initial tracks to be in radially inward locations. In the example illustrated in FIG. 4, radially inward portions 412 are used as a drive management area. A drive management area can be used for storing items such as a, preferably unique, disk identifier (e.g. a serial number), an area for storing access or unlocking information, a Table of Contents or other indexing system for the main writeable area 414, drive calibration regions (e.g. test regions for determining and/or storing optimal or preferred read/write power settings for this disk), and the like. In one embodiment, the writeable area 414 can be zoned by the user (e.g. drive ID). Radially outward of the main writeable area 414, in the illustrated embodiment, is a mastered disk information region 416. The mastered disk information region 461 can be used for storing items such as a Table of Contents or other indexing system for the mastered content 418, an indication of available writeable area, manufacturer information, type of content, information on how the disk can be used and/or how to obtain access to content e.g., how to get the disk unlocked, so that, for example, the naive user can receive appropriate instructions.

Preferably the medium 112 is relatively small and lightweight and is compatible with use in connection with a reader, player or read/write drive which is also relatively small and lightweight. Preferably the disk is less than about 35 millimeters in diameter and is useable in connection with the drive having a width less than about 52 mm a thickness less than about 10 mm and a depth less than about 40 mm, generally as described in Ser. No. 09/315,398, supra. Preferably, the medium 112 has relatively high data capacity such as storing about 0.25 Gigabytes or more, generally as described in Ser. No. 09/315,398, supra. Preferably, the disk 112, and the drive useable in connection with disk 112, is sufficiently small and lightweight as to the useable in connection a portable electronic device (PED) such as described in Ser. No. 09/315,398, supra, and including players for so-called electronic books. Advantageously, the mastered content provided on media according to the present invention are substantially smaller and less than massive than corresponding traditional media. For example, media according to the present invention used for providing so-called "electronic books" are substantially lighter and smaller than traditional print books, even when including the size and mass of a reader device therefor. In one embodiment, the reader device includes at least some electronic memory. Preferably, multiple texts (or other content) can use the same memory, as opposed to flash memory-based devices such as many digital cameras and/or audio playback devices such as MP3 which typically use conventional flash memory techniques not allowing multiple contents to use at the same memory and, typically, forcing users to purchase multiple (relatively expensive) flash memories and/or to discard content to make room in the flash memory.

Figure 2:
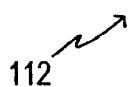
FIG. 2 is a flow chart depicting a media use procedure according to an embodiment of the present invention.
Figure 2:
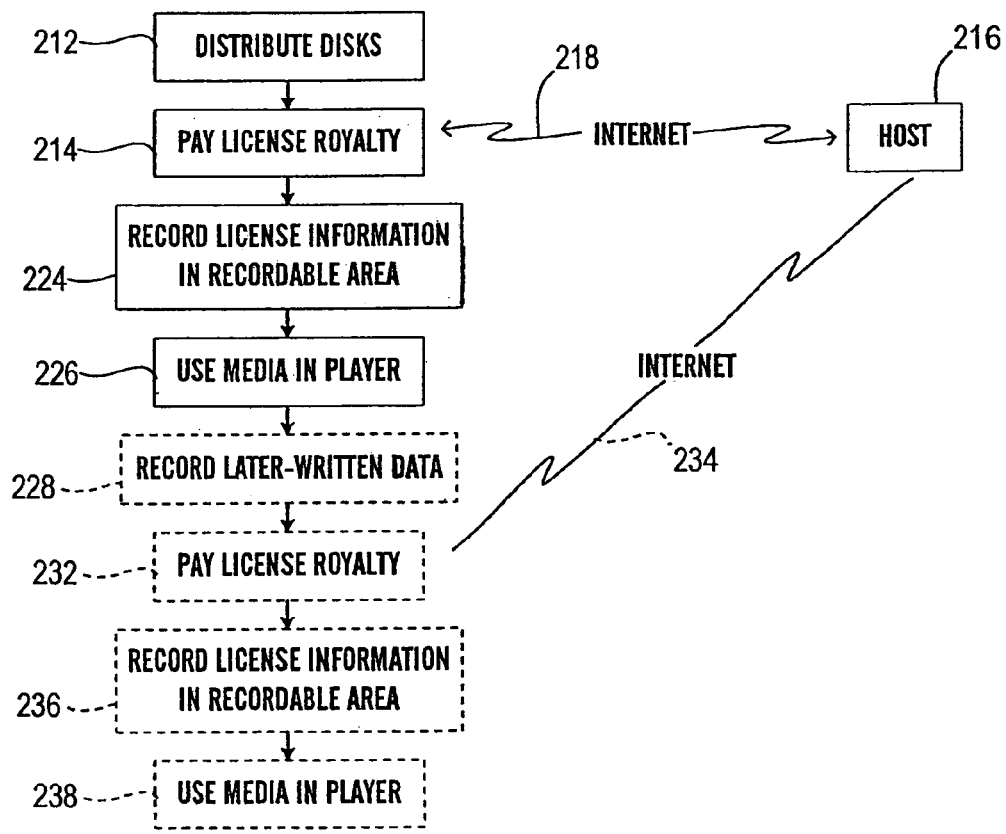

As depicted in FIG. 2, according to one embodiment of the present invention, disks having mastered content and writeable areas are distributed to users or potential users 212. A number of distribution systems and procedures can be used. It is possible to distribute such disks at conventional retail locations similar to bookstores or recorded music stores. Such distributed disks may be distributed without any use licenses, or with limited-use licenses, or may be distributed with full or substantial use licenses, typically including a royalty or use fee for covering the type and extent of license provided therewith. It is possible that different disks may be encoded with different types of licenses and/or restriction (typically each with a different cost so that a user may select which type of licenses desired, considering the various costs). The license information is preferably encoded on the medium either as part of the mastered information, or written into the writeable area, e.g. by the retail location, or both. The types of licenses or restriction that are available can include (without limitation) licenses for a particular number of uses or playbacks, licenses limited to a particular user or a particular playback machine (e.g. keyed to a user password, user key card or other token and the like), limited to a particular time period, a particular geographic location and the like. If it is desired, in some embodiments or systems, a user may be offered an opportunity to buy the copy rather than license the mastered content, typically at a substantially higher cost, but with substantially no restrictions on use or resale.

In other systems, the medium may be distributed in such a fashion that some or all of the potential license rights are not provided or available at the time of distribution but may be requested or acquired at a later time. For example, in one embodiment, media may be distributed, such as mass distributed, e.g. by mailing and the like, to subscribers or potential subscribers, to potential users who have requested the media, or in an unsolicited fashion. In one embodiment such mass-distributed media has at least some mastered content which is encrypted or otherwise not available without the input of an access code which, typically, will be available only for a payment. In some such embodiments, certain portions of the mastered media may be accessible, on a full or limited basis, without a fee. For example, a book club may mass-distribute disks having one or more books thereon in encrypted form and corresponding book review, author interviews, advertisements, promotion, selected chapters or other portions and the like available in unencrypted form. Preferably, users may then choose to obtain a license, which may be any of the types of licenses described above or other types of licenses, in exchange for a payment, whereupon the user will be provided with one or more access codes for obtaining access to one or more books. Similar procedures can be used for other types of mastered content including still images, movie pictures or videos, data for use by computers such as personal computers, laptops, work stations and the like, storage for music or other audio purposes, including storage for MP3 players, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the present invention in a wide variety of devices, e.g. to provide for ease of sharing, storing or transmitting of data, e.g. between platforms including, but not limited to devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

In one embodiment, the user may select among different types of licenses or restrictions, each associated with different prices or levels of cost. In one embodiment, the license may be content-limited such as providing the opportunity to select between accessing, text-only, for a first fee, accessing text and graphics for a second fee, accessing text, graphics and video for a third fee, accessing text and audio for a fourth fee, accessing commentary and text for a fifth fee and combinations and permutations thereof. In one embodiment, licensees or potential licensees may obtain desired licenses and/or access codes in a remote-fashion e.g. over the Internet, over a telephone system and the like. In one embodiment, the drive, player, read/write device, electronic book player, video player, audio player and the like configured for reproducing the mastered data is configured for such remote access, such as being configured for land-line, cellular telephone or other wireless connection, satellite connection, local area network connection or other connection to a web site e.g. via the Internet for obtaining an access code or license. In one embodiment, some or all portions of the processes involved in obtaining the license or access code are automated. For example, in one embodiment a user receiving such a disk may choose to simply access desired portions of the disk and, in response, the player or other apparatus according to the present invention will, at that time, or at a later time, access a remote site e.g. via the Internet and/or via a telephone or satellite link, so as to arrange for license fee payments or royalty payments such as by charging a predetermined credit card or other charge account, arranging for ordinary billing, charging a telephone, cable television service or other utility service account and the like. In one embodiment, authorization by the user is requested or required before such automated billing or charging is performed.

In the embodiment depicted in FIG. 2, in response to an indication that the royalty or license fee has been paid or arranged for (e.g. in response to a communication from the host 216, or in response to a prearranged procedure such as a prearranged agreement to charge a credit card or other account, or in response to entry of a user access code) information relating to the license is recorded in the recordable area 224. The type of information which is recorded will depend on the type of license involved. For example, if the license is limited to a particular machine, the recorded information may include an identifier or profile of the machine or components thereof. If the license is limited to a particular time period, the information may include a current date or an expiration date. If the license is limited to a particular user, the information may include key card or other token information, password information and the like. If the license is limited to a particular number of plays or displays, the number of plays or display may be recorded and the like.

Figure 3:
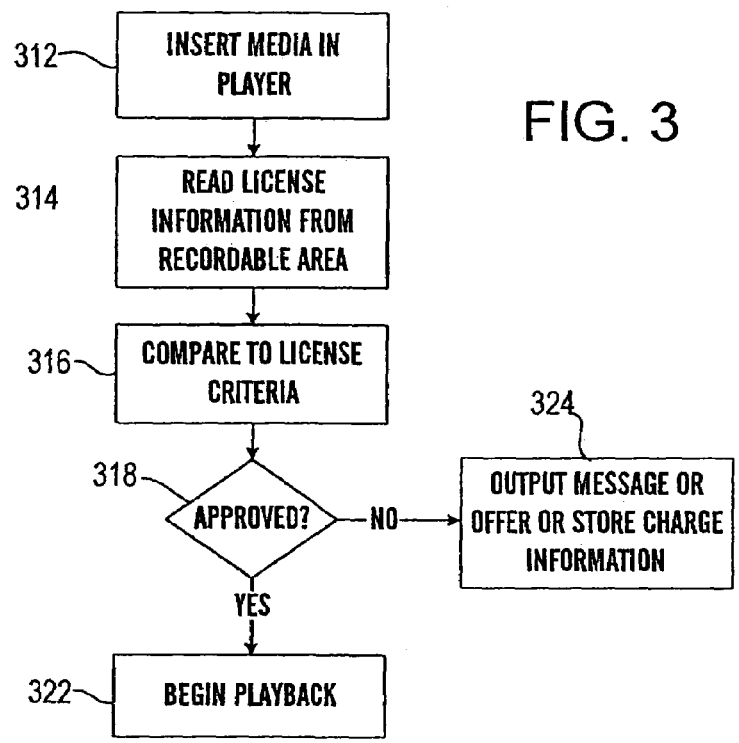
FIG. 3 is a flow chart depicting a security approval procedure according to an embodiment of the present invention.

At that point, the user may use the media in the player or playback device 226 for accessing or using the mastered and licensed content. As depicted in FIG. 3, user would typically insert the disk or similar media in the player 312 whereupon the player would read the license information from the recordable area 314. For example, the player device may read an expiration date, a total number of plays, a user password, and the like. Such read information is then compared to the license criteria 316. For example, if the license is restricted to a particular player or similar device, the player's serial number recorded on the media and read in step 314 is compared to the player's own serial number or similar information. If the comparison indicates that the access to the mastered media is approved 318, playback can begin 322. Other types of comparisons can include, for example, comparing a read expiration date to the current date, comparing a read password to an input password, comparing a maximum number of plays to a counter of executed plays and the like. In one embodiment, playback, following approval 318, involves decryption of encrypted content on the media. Preferably, the software for performing the decryption is provided on the media (e.g. as part of the mastered content). Providing the decryption (or other software related to use of the mastered content) on the disk provides a number of advantages. The user does not need to separately acquire and load decryption software (although, if desired, some or all such software may be stored on the user's machine for later user/reuse). The media can be largely platform-independent, e.g. such that, regardless of which of a plurality of book readers or other platforms the media is used in, software appropriate for accessing the content on such platform is found on the media. The user does not need to know what type of decryption software to obtain (and the user's lack of knowledge of and/or access to the decryption software is also helpful in avoiding unauthorized decryption). Different decryption or other software can be placed on different disks, to thwart unauthorized use arising from previously-broken codes and/or to provide the user with the most up-to-date software. In one embodiment, the decryption key is formed using a combination of the access code (which the user obtains for a fee) and a serial number (or other identifier) written on the media (e.g. so a second user can not gain access to content on a second disc by using the access code of the first user).

Many other systems for protection of data can be used, in addition to or in place of an encryption/decryption method as described above. In one embodiment, the protection system uses a (preferably unique) identifier of the drive device (such as providing a unique and/or random number key or similar code or identifier in a drive Read Only Memory (ROM) or made with a drive identifier), and/or a (preferably unique) identifier of the disk, either or both of which may be stored on the disk and used, e.g. as part of a system to restrict usage of a particular disk to a particular drive. For at least some media, including at least some media described in Ser. No. 09/315,398, supra, the mastered part of the disk will display a different reflectivity than a writeable area. In one embodiment the system can be configured to block attempts to read certain types of content and/or certain disk regions, which display a reflectivity indicative of a writeable area (on the assumption that such material is legitimately available only as mastered content, and it's presence in a writeable area indicates an unauthorized copy). Although is it possible to store all or part of a disk identifier, or other data used to control access, in a discrete region of the disk, such as in the writeable area, it is also possible to embed some or all such data in the mastered-content area (e.g. interspersed there with, as part of or along with synchronization or error correction code (ECC) data, and the like), to make such data hard to identify and/or modify, thus thwarting attempts at unauthorized access. Writeable areas of the disk can be used to store information related to copies made, e.g. when a user is licensed to make a limited number of copies. In some embodiments, a system may be established under which blank or otherwise writeable disks can be provided with special properties, to assist in detecting unauthorized copies; such as a (preferably unique) disk identifier, providing a mastered area with an encryption key, e.g. such that a drive can only read such key if it is in a mastered area (thus thwarting attempts to copy a key from an authorized disk to a written disk), and the like.

If the comparison indicates that access to the mastered data is not approved, according to the embodiment of FIG. 3, a device may output a signal or message to the user 324 indicating that access is denied, may output an offer indicating the cost to the user, of one or more licenses which would permit access, and/or may initiate, or arrange for future initiation, of a procedure to charge the user's credit card or other account e.g. according to a predetermined arrangement.

In the embodiment of FIG. 2, optionally the system may be configured to permit the user to record later-written data 228 such as by annotating, highlighting, writing notes, modifying, correcting, rearranging, remixing, editing, adding to, and the like, the mastered content. In one embodiment, the opportunity to record such material is provided without further license fee or charge. In another embodiment, some or all additional recording is provided only in response to payment of a fee. In one embodiment, the additional material may be material which is downloaded or otherwise obtained from a third party such as an author, editor or publisher of the some or all of the mastered material, an instructor or teacher, and the like. In one embodiment, some or all of the license fee may be in payment for the right to access and/or download revisions or new addition information, updates, errata, test or examination questions, answers or information, teacher's edition information and the like. In one embodiment, a student may use the media reader for accessing text book content e.g. during academic lectures and may record keyboard-input, handwritten or hand-drawn graphic input (either directly or using handwriting recognition), audio commentary, and the like, during the lecture or thereafter, e.g. for use in studying subject matter. Preferably some or all software used for writing, reading or using such later-written material is provided on the media, providing some or all of the advantages described above in connection with storing decryption or other content-access software.

According to one embodiment, when the original licensee, or another potential licensee, wishes to extend the license, e.g. to include additional time periods, to extend to additional users or readers or other machines, access additional content and the like, an additional license royalty may be charged and paid 232 e.g. including via a remote access method 234 as described above. In response, the new or extended license information is recorded in the recordable area 236 and the media can be used in a player 238, in accordance with the extended license, e.g. using a procedure similar to that depicted in FIG. 3.

In light of the above description, a number of advantages of the present invention can be seen. The present invention provides a medium which can provide both a mastered region and a writeable region in a manner which is cost efficient and convenient. The present invention can provide a medium, especially an optical medium, which uses the same materials, components and/or layers for both a mastered, preferably parallel-recorded content and providing a writeable area. The present invention provides a medium which can store a combination of mastered and later-written material with a high date density and capacity. The present invention provides a cost effective and feasible system and apparatus for providing reliable and preferably flexible licensing for mastered proprietary intellectual property. The present invention makes it possible for text content including relatively small-distribution items such as academic textbooks, technical or other reference books and the like, to be widely available while avoiding the need for relatively costly inventory and storage associated with traditional printed book distribution. The present invention can provide text or other content with relatively low production costs, compared to the costs of a production run of a printed book. Printed books typically have a lower (but still relatively high) cost of production per unit, when larger runs are printed. This means the print book publisher must weigh the potential per-unit savings for a large run against the risk that sales will not meet expectations (incurring inventory, shipping and/or storage costs). The relatively low cost and rapid production procedures for injection-molded media means that such media can be produced in relatively small lots, with little loss compared to larger lots. Moreover, the smaller size and weight and low cost of the media means that inventory, storage and shipping costs are relatively small. Nevertheless, there has been some resistance to non-print media, arising, it is believed, from a perception that such non-print media can be readily duplicated. The present invention provides a cost effective and feasible system for distributing text, trade book, music and other content, preferably directly to consumers from publishers while avoiding unauthorized distribution and/or copying of proprietary content. The present invention provides a system making mastered content, preferably in combination with writeable capabilities, available in a relatively small form factor for both the media and the drive so as to provide a system which is feasible for personal electronic devices (PEDs), including electronic book readers. The present invention provides a medium which provides relatively high flexibility with regard to the distribution of mastered and later-written material. In one embodiment a reflective coating is provided. In one embodiment the reflective coating used in the read only area is the same reflective film as the writeable area. A unique identifying key related to the data encryption, may be written to the disk at the time of manufacture, or later. The present invention makes it possible to provide annotations or comments which stay with the media and thus are transferred with the media whenever the media is accessed, regardless of which player or device is used. The present invention can be used to provide a small and lightweight system for accessing text or other material e.g. for use by travelers, students, technicians working on-site and the like.

A number of variations and modifications of the invention could be used. It is possible to use some features of the invention without using others. For example, it is possible to use the systems and procedures for providing desired licenses or access without using the particular media and/or drives described herein or in Ser. No. 09/315,398, supra. It is possible to provide writeable areas used in connection with controlling licenses or access or royalty payments without providing for user-controlled writing e.g. annotations and the like and vice versa. It is possible to provide media that includes both mastered areas and writeable area without usina the same structure, material, layers and the like for the two areas. In some embodiments, some or all of the mastered material may be re-writeable and/or erasable. In some embodiments, it is desired to permit accessing the mastered content in any suitable playback device so that the data is not limited to a particular player. In some embodiments, electronic text books or other content can be viewed or accessed with any or all of a number of devices including, e.g. a personal digital assistant (PDA), portable computer or electronic book reader. Preferably, notes, highlights, bookmarks, cross references, annotations and the like may be included in the text material for later printout or review. In some embodiments, keys embedded in the reader unit and/or the media can control portability. The later-written annotations or other material may be provided to later users and/or may be made inaccessible to later users. In one embodiment, a reader or other device can be configured for displaying the amount of unused writeable area remaining e.g. such that later users or licensees will know how much additional annotation or other additional information can still be recorded. The storage capacity of the media can be used for storing numerous items, including, without limitation, any or all of a plurality of different books or other works on a single disk, Audio, video or image content, provision of one or more books (or other works) in multiple forms, such as in complete or abridged versions, two or more different languages (or providing other multiple language support), providing reader assistance such as dictionary information, e.g. for words included in the works, historical or other related information, thesaurus services and the like, commentaries by the author, critics, other readers, literary criticism, commentary or explanations, advertising, excerpts from other works (or other "teasers"), audio annotations and other items. The writeable area of the media can be used for numerous items, including, without limitation, any or all of codes, programming data or the like for use in unlocking all or part of the other mastered and/or later-written material (e.g. unlocking selected ones of multiple books on a disk), either for unlimited future use or time-limited use (e.g. to effect leasing of disk content for a period), storing keyboard-entered, handwritten, audio or other user notes or commentary, instructional, pedagogical or academic content, such as course syllabi, teacher notes, tests, supplemental material, which in some embodiments may be downloaded or otherwise acquired at the beginning of a course, book updates or corrections (e.g. errata), creating or storing a custom book collection, storing of personal settings, preferences, bookmarks and the like, updating or correcting reference works such as catalogs, user manuals, atlases, travel guides, phone directories and the like (e.g. so that a user can have access to an up-to-date resource by downloading only corrections, i.e. without having to download an entire new edition). A number of systems and procedures can be used for obtaining a decryption key or other access code (e.g. in exchange for a payment), including, without limitation, by telephone, by the Internet or similar communications system, in a bookstore or other traditional retail location, in a classroom (e.g. for textbooks), through a system of kiosks, and/or by buying or otherwise obtaining pre-unlocked disks.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An access method for an optical disk including a single continuous information layer having a first region containing parallel-written mastered content and a second region which is user writable, the method comprising:
    recording license information in the second region of the single continuous information layer;
    comparing the license information to license criteria; and
    permitting access to at least a portion of the mastered content responsive to the comparison of the license information to license criteria.

2. The method of claim 1, wherein the optical disk is a first surface optical disk.

3. An access method for an optical disk including a single continuous information layer comprises a phase change layer.

\* \* \* \* \*